US008224782B2

(12) United States Patent
Murase

(10) Patent No.: US 8,224,782 B2
(45) Date of Patent: Jul. 17, 2012

(54) SYSTEM AND METHOD FOR CHUNK BASED TIERED STORAGE VOLUME MIGRATION

(75) Inventor: Atsushi Murase, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 335 days.

(21) Appl. No.: 12/240,839

(22) Filed: Sep. 29, 2008

(65) Prior Publication Data

US 2010/0082765 A1    Apr. 1, 2010

(51) Int. Cl.
    *G06F 7/00*      (2006.01)
    *G06F 13/00*     (2006.01)
    *G06F 15/167*    (2006.01)

(52) U.S. Cl. ........ 707/653; 707/654; 707/651; 707/635; 711/114; 711/173; 711/170; 709/213

(58) Field of Classification Search .................. 707/637, 707/651, 657, 660, 829, 822, 825, 653, 654, 707/635; 709/213–216; 711/117, 114, 173, 711/170
    See application file for complete search history.

(56) References Cited

U.S. PATENT DOCUMENTS

| | | | |
|---|---|---|---|
| 5,860,137 A * | 1/1999 | Raz et al. ...................... | 711/202 |
| 6,898,667 B2 * | 5/2005 | Umberger et al. ............ | 711/114 |
| 7,062,624 B2 | 6/2006 | Kano | |
| 7,441,096 B2 * | 10/2008 | Kitamura ....................... | 711/203 |
| 7,546,610 B2 * | 6/2009 | Aridor et al. .................. | 719/320 |
| 7,567,188 B1 * | 7/2009 | Anglin et al. ................... | 341/63 |
| 7,613,747 B1 * | 11/2009 | Thakur et al. ........................ | 1/1 |
| 7,668,882 B2 * | 2/2010 | Nakatani et al. .............. | 707/634 |
| 7,860,916 B2 * | 12/2010 | Blaszczak .................... | 709/200 |
| 2004/0162958 A1 | 8/2004 | Kano et al. | |
| 2006/0069862 A1 * | 3/2006 | Kano ............................ | 711/114 |
| 2008/0120459 A1 * | 5/2008 | Kaneda et al. ................ | 711/112 |
| 2008/0168228 A1 * | 7/2008 | Carr et al. ..................... | 711/117 |
| 2008/0301763 A1 * | 12/2008 | Sasaki et al. ...................... | 726/1 |
| 2010/0077168 A1 * | 3/2010 | Arakawa ....................... | 711/165 |

OTHER PUBLICATIONS

Automated Tiered Storage Systems, Data Progression, Compellent, http://www.compellent.com/Products/Software/Automated-Tiered-Storage.aspx, retrieved on Sep. 24, 2008.

* cited by examiner

*Primary Examiner* — Gregory Todd
(74) *Attorney, Agent, or Firm* — Sughrue Mion, PLLC

(57) ABSTRACT

System and method for reducing costs of moving data between two or more of multi-tiered storage devices. Specifically, the system operates by moving only high tier portion of data and merely remapping the low tier data to migration target device, which eliminates a large amount of data movement (low tier) while maintaining the SLA of high tier data. Specifically, when a command to migrate a thin provisioned volume is received from a source primary storage device to another target primary storage device, the system doesn't copy all of the tier1 and tier2 chunk data that the source thin provisioned volume holds, but copies only tier1 chunk data to the target storage device. The copy operation is performed after the storage system prepared the target thin provisioned volume on the target side. After that, tier2 chunks are remapped from the primary storage device to another target primary storage device without copying.

20 Claims, 11 Drawing Sheets

Logical Element Structure – (b) Migration

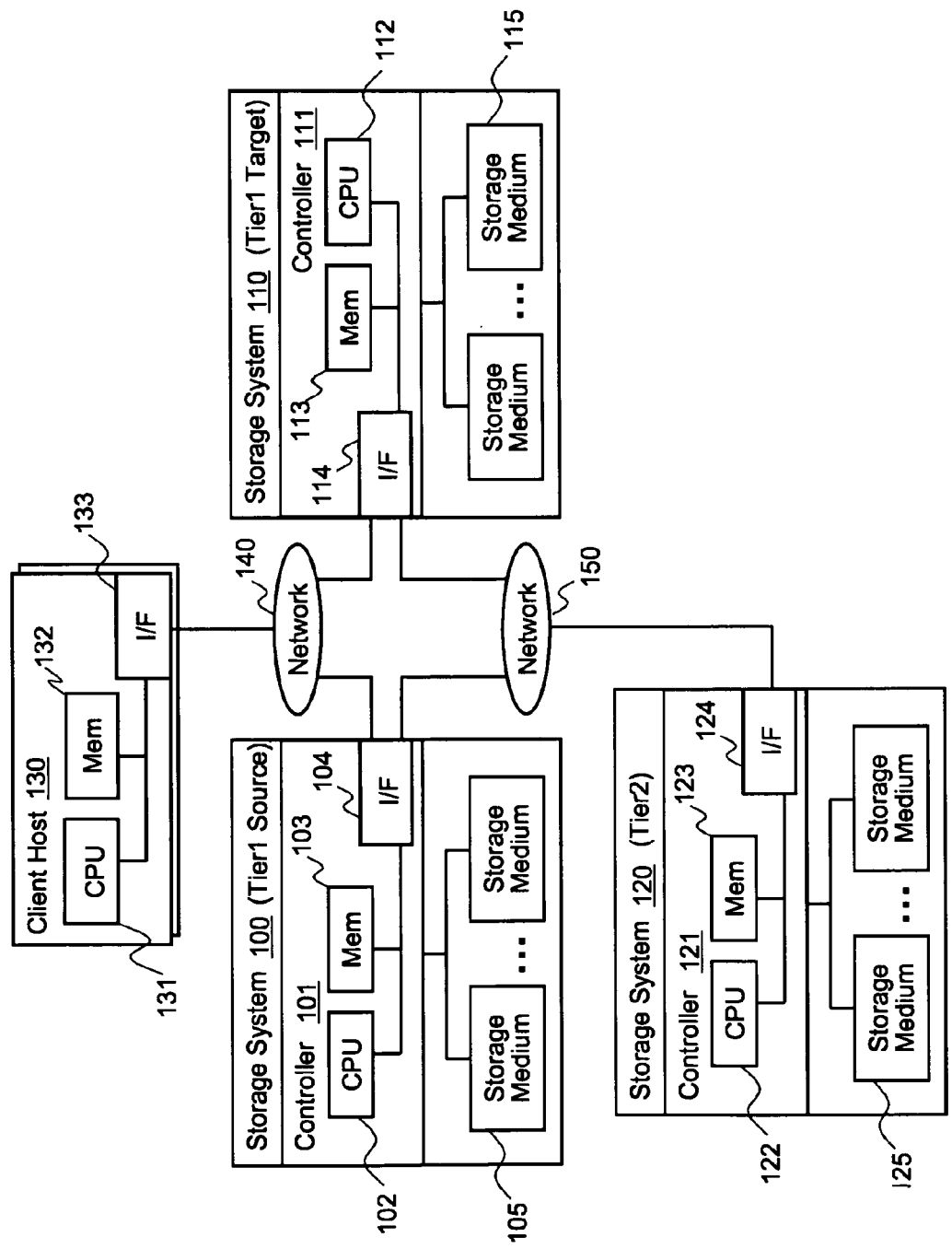
FIG. 1 Hardware Architecture

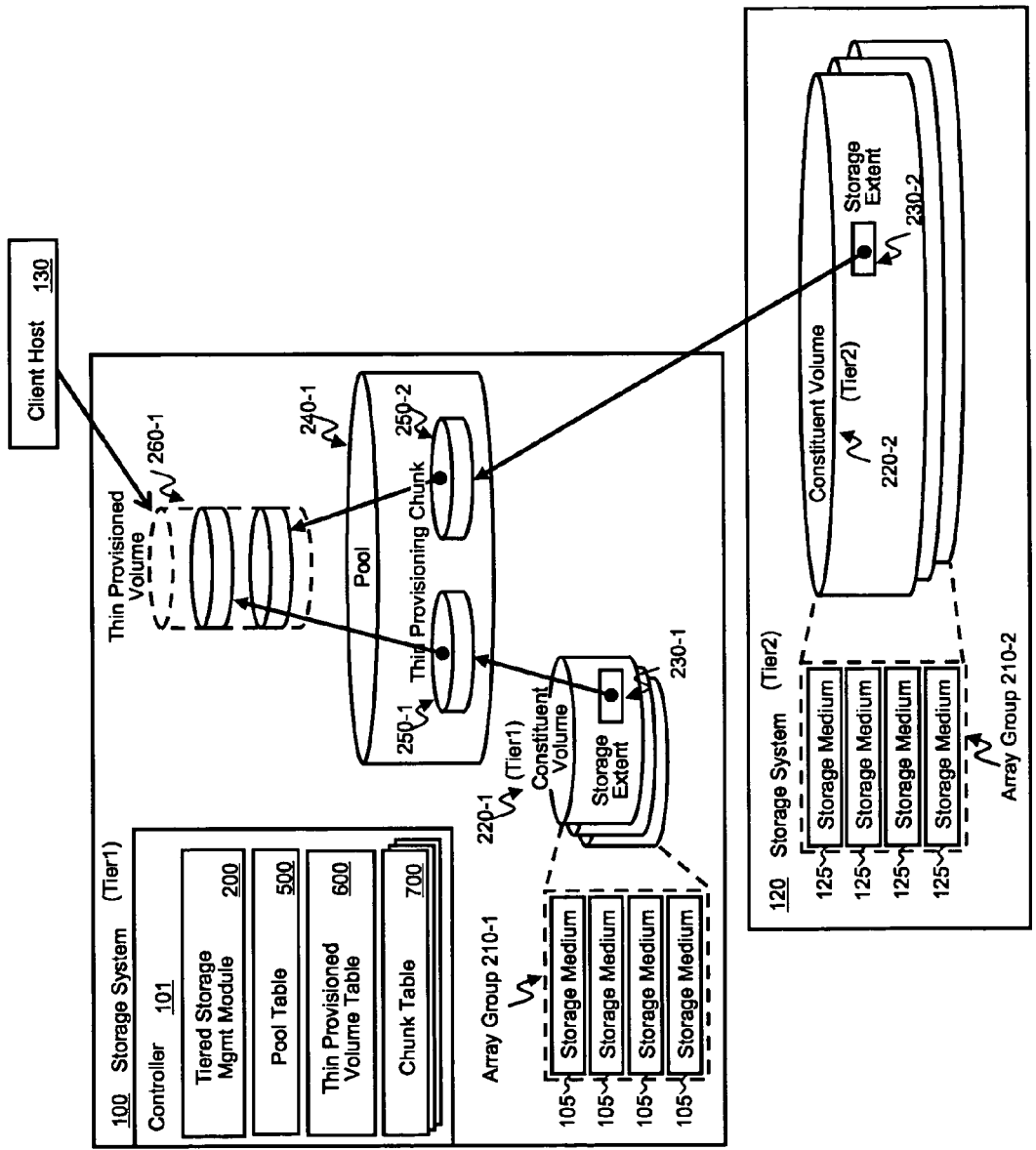
FIG. 2 Logical Element Structure – (a) Initial

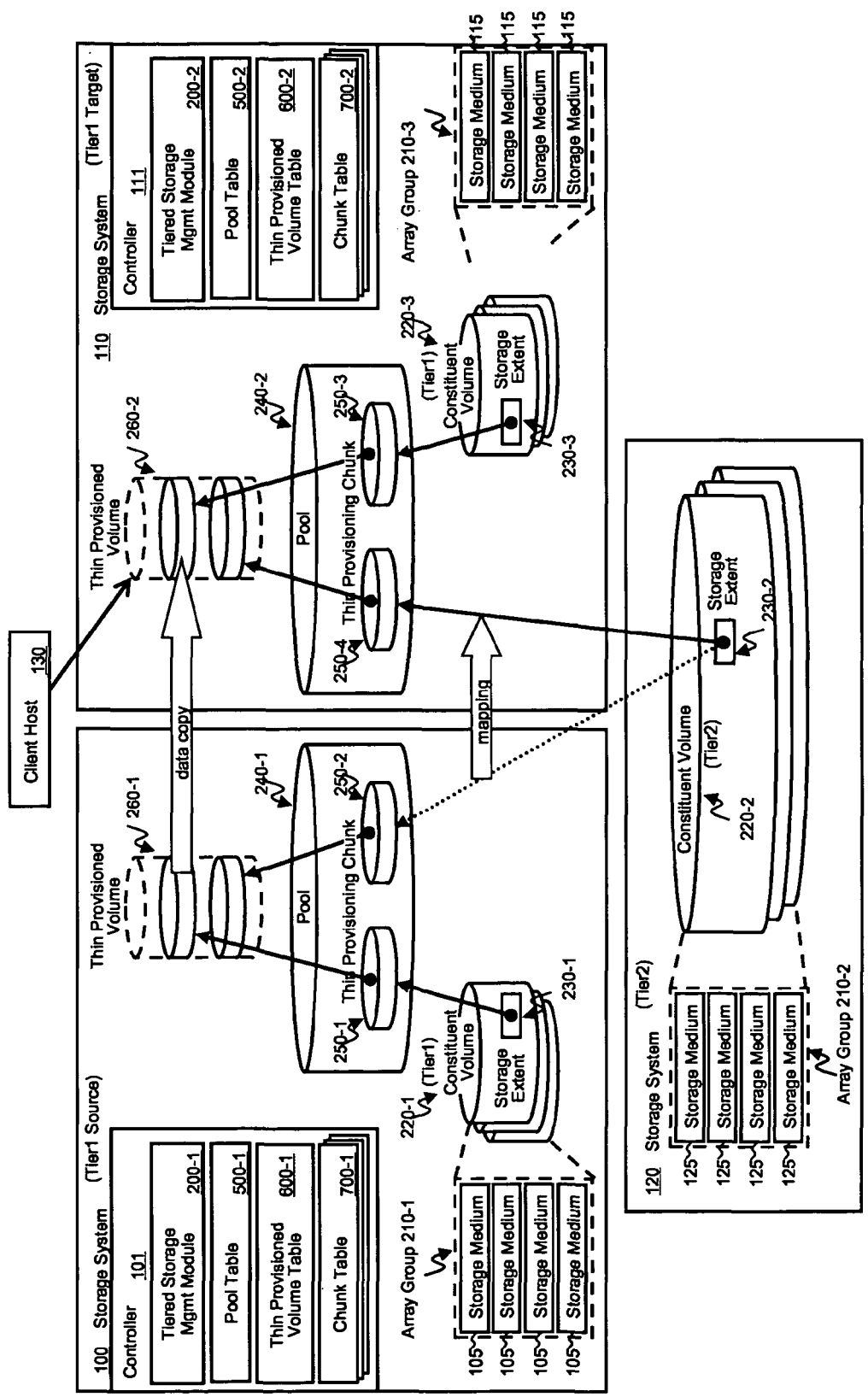
FIG. 3 Logical Element Structure – (b) Migration

| Pool ID 510 | C-Vol ID 520 | Tier 530 |
|---|---|---|
| PS1 | T1CV1 | 1 |
| PS1 | T2CV5 | 2 |
| PS1 | T2CV6 | 2 |
| PS2 | T1CV2 | 1 |
| ... | ... | ... |

FIG. 4 Data Structure of Pool Table

| TP-Vol ID | Pool ID | Chunk Table ID |
|---|---|---|
| TPVS1 | PS1 | CTS1 |
| TPVS2 | PS1 | CTS2 |
| TPVS3 | PS2 | CTS3 |
| TPVS4 | PS2 | CTS4 |
| ... | ... | ... |

FIG. 5  Data Structure of Thin Provisioned Volume Table

| Chunk ID 710 | C-Vol ID 720 | Tier 730 | Start LBA 740 | Number of Blocks 750 |
|---|---|---|---|---|
| CS1 | T1CV1 | 1 | 0 | 32 |
| CS2 | T2CV5 | 2 | 0 | 32 |
| CS3 | T2CV5 | 2 | 32 | 25 |
| CS4 | T2CV6 | 2 | 0 | 32 |
| ... | ... | ... | ... | ... |

FIG. 6 Data Structure of Chunk Table

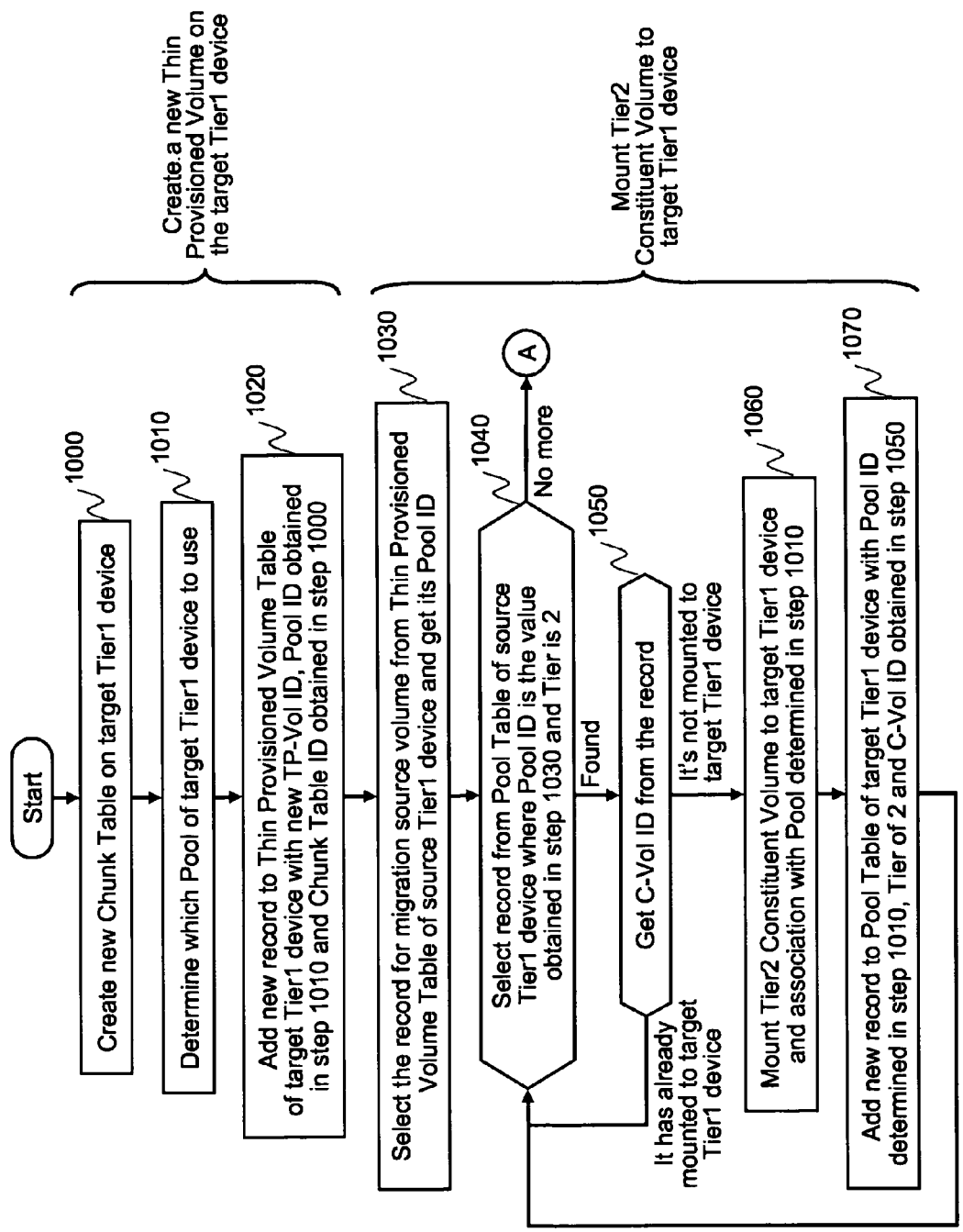
FIG. 7 Process of Volume Migration (a)

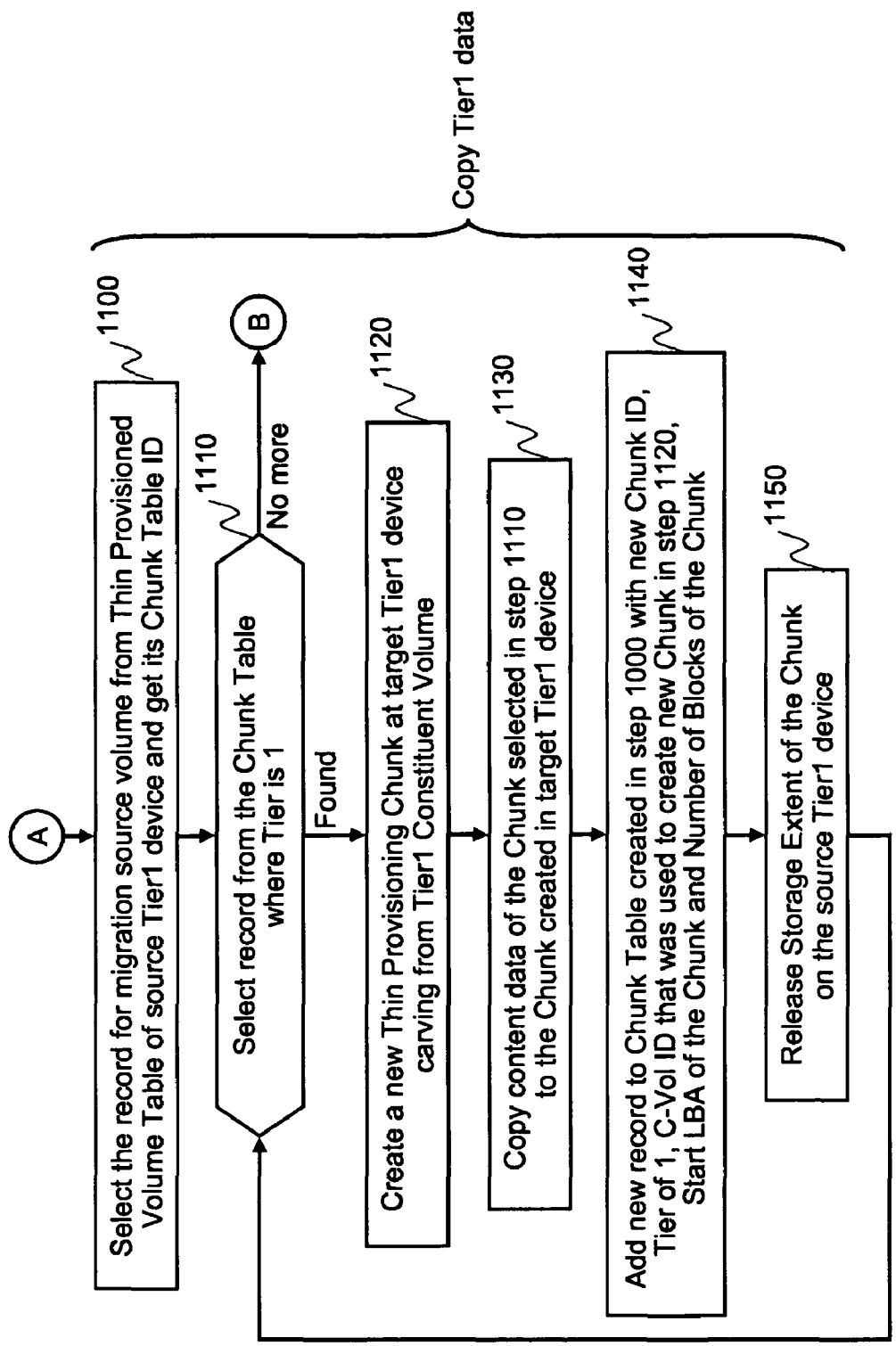
FIG. 8 Process of Volume Migration (b)

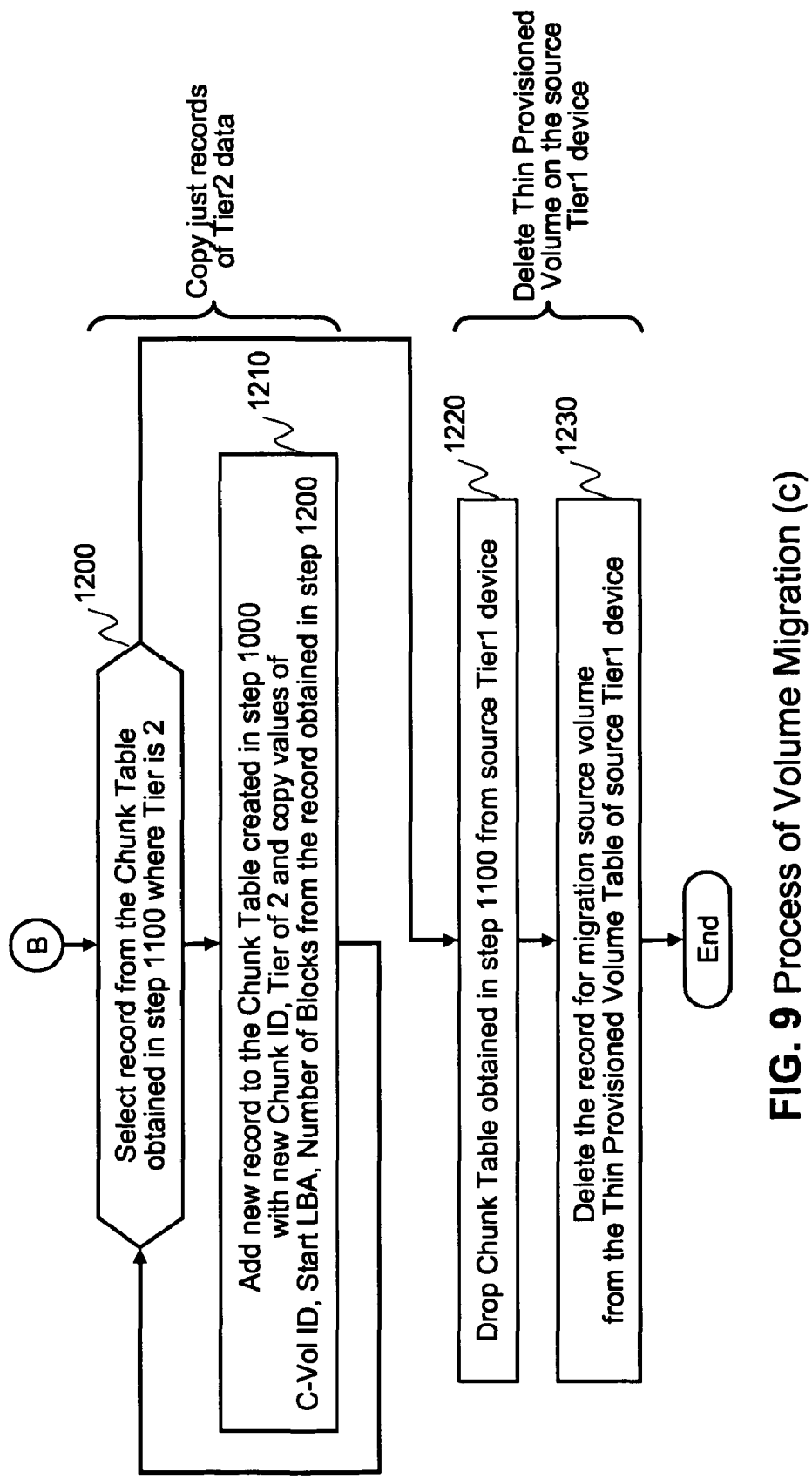
FIG. 9 Process of Volume Migration (c)

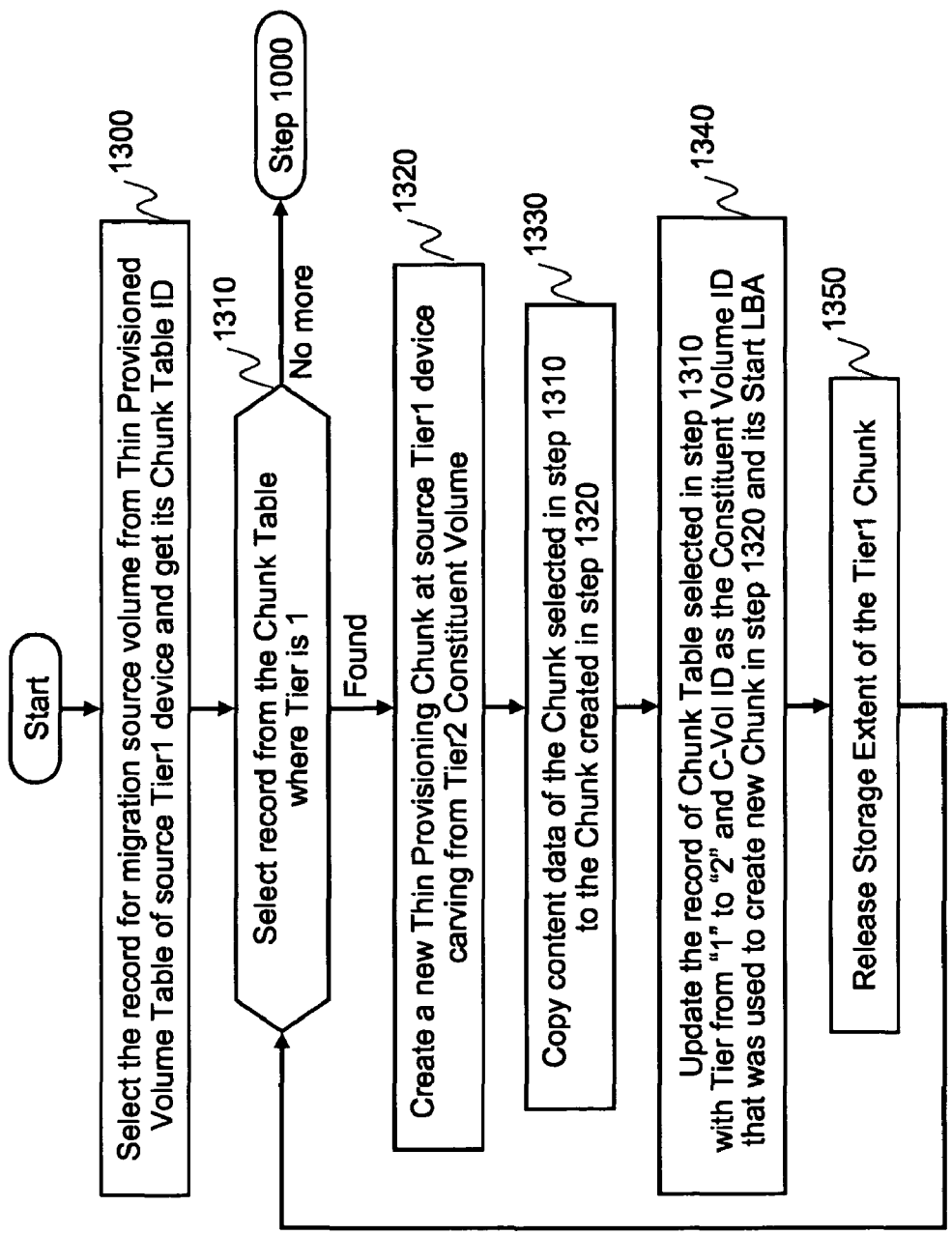
FIG. 10 Process of Chunk Demotion

SYSTEM AND METHOD FOR CHUNK BASED TIERED STORAGE VOLUME MIGRATION

DESCRIPTION OF THE INVENTION

1. Field of the Invention

This invention generally relates to storage systems and more specifically to optimizing operation of tiered storage systems with data migration capability.

2. Description of the Related Art

The amount of business information of various types has been growing at a very high rate year over year and will likely continue to do so. Every single piece of this business data has to be kept and protected properly. However, the importance, frequency of access, and required reliability level of the various types of data vary significantly, hence not all types of data need to be stored in high performance and high cost storage devices. In order to reduce the storage costs, each unit of data should be stored in a storage device having appropriate performance characteristics commensurate with the use and importance of the stored data, as determined by various data attributes.

In addition to the dramatic increase in the volume of the stored data, more and more data needs to be moved or copied between storage devise due to various reasons, such as device replacement and business continuity requirements (clustered system, disaster recovery, backup and recovery). In addition, the data needs to be moved as required by the internal operation of the dynamic virtual server platforms.

Tiered Storage systems provide solutions for reducing the cost of storing Service Level Agreement (SLA) data. In this solution, SAN incorporates storage devices of multiple storage tiers. These multiple tiers may include a high reliability, high performance but high cost storage tier, a storage tier with lower access speed and lower storage costs, or a very low storage cost tier for data archiving. Other tiers are also possible. Data will be stored in the storage of appropriate tier according to the data attributes. The data may be also dynamically migrated between tiers based on the current data usage conditions. Thus, as would be appreciated by those of skill in the art, using multiple tiers of storage resources achieves the reduction of the overall storage system cost by optimizing the allocation of the storage for a specific data in accordance with required access speed or reliability for that data.

A thin provisioning technology helps improving the storage space utilization. The thin provisioning technology presents full volume capacity virtually to a host but allocates actual physical storage only when a write command has been received for a specific region of the data volume. Partial capacity, a chunk, is carved from the storage extent called thin provisioning pool, when the storage capacity allocation request is received. In this type of storage system such that allocating storage extent with the small amount of capacity (Chunk) may have ability to manage tier by the granularity of the Chunk instead of the size of whole volume in order to achieve more efficiency of utilization of appropriate characteristics of storage devices. It provisions new capacity from proper tier or controls dynamic data migration between tiers by the Chunk granularity. Furthermore, having plural tier of Chunks may be hidden from host. Host only sees a single Thin Provisioned Volume and doesn't know whether it contains several characteristic of chunks. The system automatically can provision or dynamically migrate chunks within the volume without showing the action to the host.

The technologies enumerated above reduce the cost of storage when the data is statically stored without frequent data transfers. However, because the data relocation or duplication operations have become common in many situations, the costs associated with moving the data started to present a new serious problem that needs to be solved. Unfortunately, the current solutions fail to address this problem. Therefore, what is needed is a solution for minimizing data movement cost, while preserving the benefits of tiered storage systems.

SUMMARY OF THE INVENTION

The inventive methodology is directed to methods and systems that substantially obviate one or more of the above and other problems associated with conventional techniques for deploying multiple server instances.

In accordance with an aspect of the inventive concept, there is provided a computerized storage system including a client host computer and a source first tier storage system operatively coupled to the client host computer. The source first tier storage system includes at least one source first tier storage device having multiple source first tier chunks arranged into a source chunk pool and a source storage controller. The inventive system further includes a second tier storage system operatively coupled to the source first tier storage system. The second tier storage system includes at least one second tier storage device having multiple second tier chunks arranged into the chunk pool of the source first tier storage system. The source storage controller allocates source first tier chunks or second tier chunks from the source chunk pool to a source thin provisioned volume accessible by the host computer upon a receipt of a write command directed to the source thin provisioned volume from the host computer. The inventive system further includes a target first tier storage system operatively coupled to the client host computer. The target first tier storage system includes at least one target first tier storage device having multiple target first tier chunks arranged into a target chunk pool and a target storage controller for establishing a target thin provisioning volume. Upon migration of data from the source thin provisioning volume to the target thin provisioning volume the source first tier chunks of the source thin provisioning volume are copied to the target first tier chunks of the target thin provisioning volume and the second tier chunks are re-mapped from the source thin provisioning volume to the target thin provisioning volume.

In accordance with another aspect of the inventive concept, there is provided a computerized storage system including a client host computer and a source first tier storage system operatively coupled to the client host computer. The source first tier storage system includes at least one source first tier storage device having multiple source first tier chunks arranged into a source chunk pool and a source storage controller. The inventive system further includes a second tier storage system operatively coupled to the source first tier storage system, the second tier storage system including at least one second tier storage device having a multiple second tier chunks arranged into the chunk pool of the source first tier storage system. The source storage controller allocates source first tier chunks or second tier chunks from the source chunk pool to a source thin provisioned volume accessible by the host computer upon a receipt of a write command directed to the source thin provisioned volume from the host computer. The inventive system further includes a target first tier storage system operatively coupled to the client host computer, the target first tier storage system having at least one target first tier storage device having multiple target first tier chunks arranged into a target chunk pool and a target storage controller operable to establish a target thin provisioning volume. Upon migration of data from the source thin provisioning volume to the target thin provisioning volume, the source first tier chunks of the source thin provisioning volume are demoted to new second tier chunks of the source thin provisioning volume and the second tier chunks are re-mapped from the source thin provisioning volume to the target thin provisioning volume.

In accordance with yet another aspect of the inventive concept, there is provided a method performed in a computerized storage system including a client host computer and a source first tier storage system operatively coupled to the client host computer. The source first tier storage system includes at least one source first tier storage device having multiple source first tier chunks arranged into a source chunk pool and a source storage controller. The computerized storage system further includes a second tier storage system operatively coupled to the source first tier storage system, the second tier storage system having at least one second tier storage device having multiple second tier chunks arranged into the chunk pool of the source first tier storage system. The source storage controller allocates source first tier chunks or second tier chunks from the source chunk pool to a source thin provisioned volume accessible by the host computer upon a receipt of a write command directed to the source thin provisioned volume from the host computer. The computerized storage system further includes a target first tier storage system operatively coupled to the client host computer, the target first tier storage system having at least one target first tier storage device having multiple target first tier chunks arranged into a target chunk pool and a target storage controller for establishing a target thin provisioning volume. The inventive method involves, upon migration of the data from the source thin provisioning volume to the target thin provisioning volume, copying the source first tier chunks of the source thin provisioning volume to the target first tier chunks of the target thin provisioning volume and re-mapping the second tier chunks from the source thin provisioning volume to the target thin provisioning volume.

In accordance with a further aspect of the inventive concept, there is provided a method performed in a computerized storage system including a client host computer and a source first tier storage system operatively coupled to the client host computer. The source first tier storage system includes at least one source first tier storage device having multiple source first tier chunks arranged into a source chunk pool and a source storage controller. The computerized storage system further includes a second tier storage system operatively coupled to the source first tier storage system. The second tier storage system includes at least one second tier storage device having multiple second tier chunks arranged into the chunk pool of the source first tier storage system. The source storage controller allocates source first tier chunks or second tier chunks from the source chunk pool to a source thin provisioned volume accessible by the host computer upon a receipt of a write command directed to the source thin provisioned volume from the host computer. The computerized storage system further includes a target first tier storage system operatively coupled to the client host computer. The target first tier storage system includes at least one target first tier storage device having multiple target first tier chunks arranged into a target chunk pool and a target storage controller for establishing a target thin provisioning volume. The inventive method involves, upon migration of data from the source thin provisioning volume to the target thin provisioning volume, demoting the source first tier chunks of the source thin provisioning volume to second tier chunks of the source thin provisioning volume; and re-mapping the second tier chunks from the source thin provisioning volume to the target thin provisioning volume.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 illustrates an exemplary hardware architecture of the first embodiment of the invention.

FIGS. 2 and 3 show software and logical element structure corresponding to the embodiment shown in FIG. 1.

FIGS. 4, 5 and 6 illustrate data structure of various tables stored in the Memory of the Controller.

FIGS. 7, 8 and 9 illustrate an exemplary process for Thin Provisioned Volume migration between the tiered storage systems executed by Tiered Storage Management Module.

FIG. 10 shows an example process for Chunk demotion (Tier1 to Tier2 Chunk) executed by Tiered Storage Management Module.

DETAILED DESCRIPTION

Figure 11:
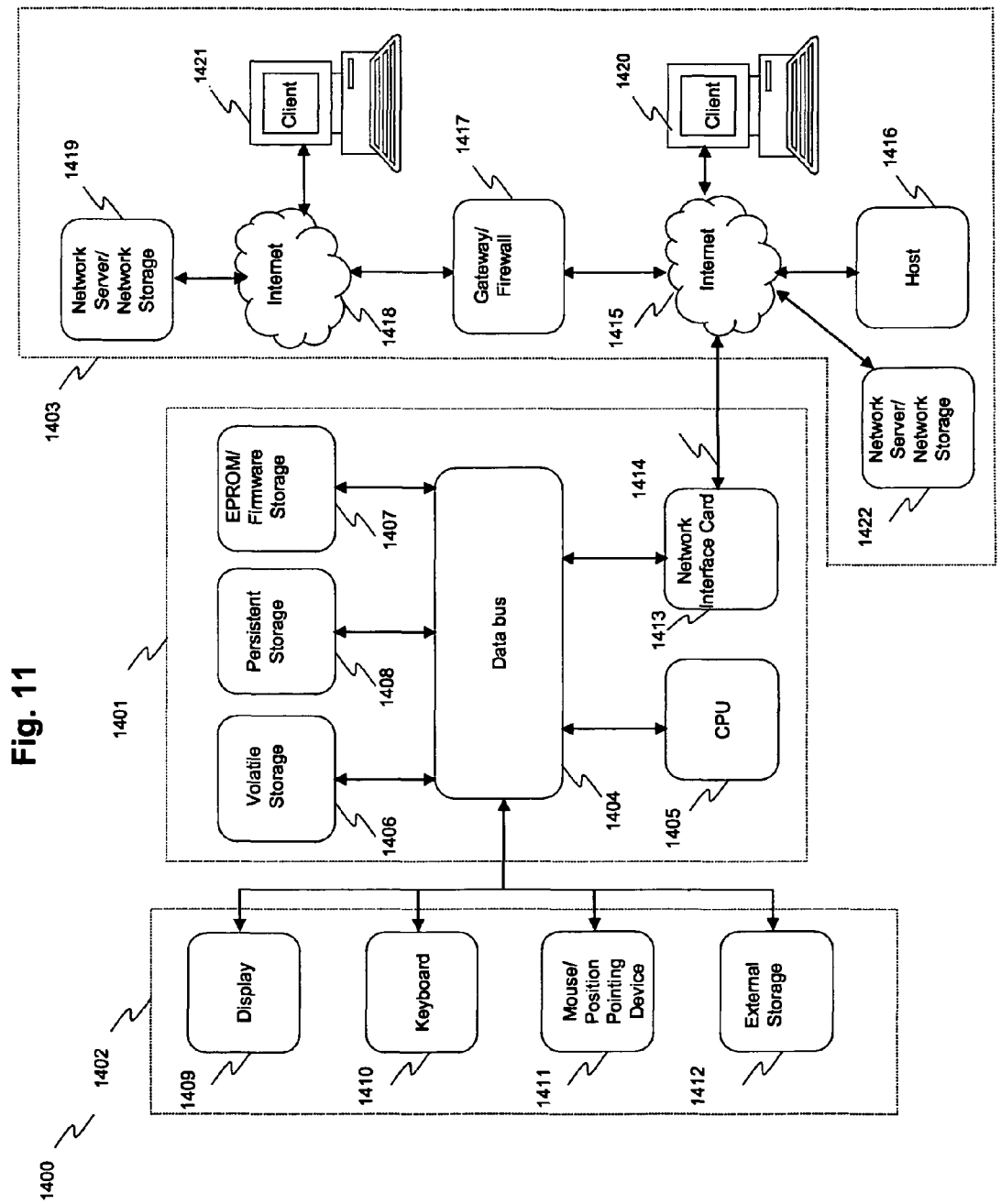
FIG. 11 illustrates an exemplary embodiment of a computer platform upon which the inventive system may be implemented.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provide systems and methods for chunk based tiered storage volume migration. A chunk based tiered storage system disclosed in this invention provides thin provisioned volume (TPV) to the host. The system allocates new chunks upon the receipt of a write operation command. The filesystem on the host is not aware of the tiered structure within the storage system.

Meanwhile, the storage system automatically performs dynamic data tier management based on the granularity of the chunks. The management may be accomplished, for instance, based on the access frequency to the specific chunks. Chunks are carved from the thin provisioning pool to the thin provisioned volume and the pool is composed of high performance tier1 constituent volumes and lower performance tier2 constituent volumes. Therefore, both expensive tier1 chunks and reasonably priced tier2 chunks can be used for the thin provisioned volume in accordance with predetermined condition(s). The above system, as mentioned before, dynamically manages data movement from tier1 to tier2 (or vice versa) chunks automatically based, for instance, on their respective access frequency.

In this invention, it is assumed that the storage system incorporates the tier with high performance primary storage device as tier1 and an externally attached, using storage virtualization technology, lower priced and lower performance secondary storage device as tier2. Therefore, the tier1 constituent volume is located on the primary storage device and the tier2 constituent volume, which typically has much higher storage capacity than the tier1 constituent volume, is located on an externally attached secondary storage device.

When an embodiment of the inventive system receives a command to migrate a thin provisioned volume from a source primary storage device to another target primary storage device, the inventive system doesn't copy all of the tier1 and tier2 chunk data that the source thin provisioned volume holds, but copies only tier1 chunk data to the target storage device. The copy operation is performed after the storage system prepared the target thin provisioned volume on the target side.

After that, the inventive system refers to the pool, which supplied chunks to the migration source thin provisioned volume and finds tier2 constituent volumes that are included in the pool. The found tier2 constituent volumes are located on the externally attached secondary storage device which actually holds the tier2 chunks, which are associated with the thin provisioned volume. The inventive system then refers to the pool on the migration target primary storage device and mounts tier2 constituent volume to that pool.

Finally, the inventive system copies the chunk mapping table, which stores information on the relationships between each of the chunks and the constituent volumes that actually provide the storage extent for those chunks, from the new thin storage device to the target storage device so that the new thin provisioned volume can be associated to the tier2 chunks on the secondary storage device and the whole tier1 and tier2 chunks are accessible from the host.

By copying only tier1 chunks during the migration operation, the inventive system dramatically reduces the data relocation costs because typically the tier2 data is much larger in size than the tier1 data. At the same time, the tier1 data will be actually copied to the specific migration target primary storage device so that it can deliver high access speed performance after the migration. While the tier2 data is characterized by slower access speed, a high access speed is typically not required from the tier2 data. Performing actual copy only for the data that needs to be accessed at a fast access speed after the migration and merely switching the externally attached path for the less frequently accessed data improves the overall efficiency of the data movement.

Now, exemplary embodiments of the invention will be described in detail.

FIG. 1 illustrates an exemplary hardware architecture of the first embodiment of the invention. The shown system incorporates Storage Systems 100, 110, 120 and Client Hosts 130. Client Hosts and Storage Systems 100, 110 are connected through a Network 140. The Network 140 can be implemented using a wide variety of technologies and is called a frontend network. Also all Storage Systems are connected through a different Network 150, which is a backend network.

Now, the Storage Systems 100, 110 and 120 will be described. Storage System 100 is a primary storage device, which holds the tier1 data and is the source device during the data migration operation. It incorporates a Controller 101 and a Storage Media 105. The Storage Media in the primary storage device will be a high quality media such as FC disk drive. The Controller 101 includes a CPU 102, a Memory 103, and a Network Interface 104. Storage Media are connected to the Controller 101 and it could be variety type of device such as hard disk, flash memory, optical disk, tape, and so on. The Storage System 110 also represent as another primary storage device which will holds the Tier1 data and will be the target side of device during the data migration. Its components are same as Storage System 100. Those two devices 100 and 110 are connected to the Client Hosts. Storage System 120 represent as a secondary storage device which holds the Tier2 data. Components are similar to the other Tier1 primary devices but it composed with more reasonable Storage Mediums 125 such as SATA disks. Tier2 secondary device is connected to the Tier1 devices through the backend Network 150.

The Client Host (130) will now be described. The Client Host is a generic computer that comprises a CPU 131, Memory 132, and a Network Interface 133. It is a terminal computer for the storage service user.

FIGS. 2 and 3 show software and logical element structure corresponding to the embodiment shown in FIG. 1. FIG. 2 shows the initial condition of an embodiment of the inventive system, before the migration operation starts, and the FIG. 3 illustrates the condition of the inventive system during or after the data migration.

In FIG. 2, the Storage Volume Composition of Tier2 Storage System 120 is shown. Specifically, the Array Group 210-2 is the logical capacity which is composed of a plurality of Storage Mediums 125 (so-called RAID group). For example, it could be composed as a RAID 5 array with 3 disks of data and 1 parity disk. The Constituent Volume 220-2 (for Tier2 data) is another logical capacity which is carved from the Array Group. A plurality of Constituent Volumes will then be assigned to the Pool to provide the actual capacity for storing the Tier2 data. Storage Extent 230-2 is storage capacity which is carved from the Constituent Volume as an atom of data stored extent.

Similarly, the Storage Volume Composition of the Tier1 Storage System 100 will have the same elements as the Tier2 device, as shown with the Array Group 210-1, the Constituent Volumes 220-1 and the Storage Extent 230-1. Generally, the Constituent Volumes themselves are not shown directly to the end user in terms of the thin provisioning storage service but rather in terms of the amount of free space provided as Pool 240-1. The Thin Provisioning Chunk 250 is a unit of capacity allocated from the Pool to the Thin Provisioned Volume 260-1. The Pool is associated with both tier levels of Constituent Volumes 220-1 and 220-2, thus it can provide both tier type of Chunks to the Thin Provisioned Volume. The Thin Provisioned Volume 260-1 is the storage volume that is exposed to the Client Hosts 130. It is represented as if it has full size capacity, but only the extent to which data has been written by the Client Host will be allocated. When the Client Host writes data to the extent that unallocated capacity needs to be used, the Storage System will generate a new Thin Provisioning Chunk and associate it to the Thin Provisioned Volume to the extent of the data written by the Client Host. The Chunk may be carved from the Tier1 device internally or from the externally attached Tier2 device.

The software stored and executed by the Controller 101 includes a Tiered Storage Management Module 200, which uses and manages a Pool Table 500, a Thin Provisioned Volume Table 600 and a Chunk Table 700. The Tiered Storage Management Module 200 is a key program of this invention for the operation of data migration between the tiered storage devices. The Pool Table 500 holds records for Pools which have a respective Constituent Volume ID and tier information. The Thin Provisioned Volume Table 600 holds records which have the Pool ID that the volume was carved from and related Chunk Table ID for the volume. The Chunk Table 700 holds records of the Chunk attributes and the ID of the Constituent Volume where the actual data was stored for each Chunk. The Chunk Table will be generated for each Thin Provisioned Volume.

FIG. 3 illustrates the condition of the system during the data Migration and specifically it shows Storage Volume composition of Tier1 Storage Systems 100, 110, and 120. Storage System 110 represents the migration target Tier1 system (while Storage System 100 represents as the migration source storage system in this figure). The components of this system are the same as Storage System 100, which was described above. However the relationship of the systems will be changed during or after the migration operation. The Thin Provisioned Volume 260-2 is the newly created volume, which is the target of the data copy operation from the source Thin Provisioned Volume 260-1. After the completion of the migration, the Client Host 130 will unmount Thin Provisioned Volume 260-1 from the source side and mount the Thin Provisioned Volume 260-2 for the target side. During the migration, in this embodiment of the invention, only the contents of Tier1 chunks will be copied to the target storage system and in accordance with the copy new Tier1 Thin Provisioning Chunk 250-3 will be allocated from the Pool 240-2 to the Thin Provisioned Volume 260-2. Also, these chunks are originally carved from the Tier1 Constituent Volumes 220-3.

During the migration, Tier2 Constituent Volumes 220-2 which were associated with the Pool 240-1 on the migration source device will be mounted to the Pool 240-2 on the target device side (remapping the related Tier2 Constituent Volumes from source device to the target device). Therefore, the existing Tier2 Chunks 250-4 can be accessed by the client host computer as a part of the Thin Provisioned Volume 260-2.

The Pool Table 500-2, Thin Provisioned Volume Table 600-2 and Chunk Table 700-2 are updated or generated during the migration and related information on the source device side will be discarded after the migration.

FIGS. 4, 5 and 6 illustrate data structure of various tables stored in the Memory of the Controller. Specifically, FIG. 4 shows an exemplary data structure of the Pool Table 500. The tables contain information on which Constituent Volumes compose respective Pools.

In the table of FIG. 4, the Pool ID column 510 provides an identification of a Pool. The C-Vol ID column 520 provides Identification of the Constituent Volume, which composes the Pool.

The Tier column 530 provides the information on the Tier of the Constituent Volume.

For instance, line 591 in the table represents a record of a Pool which has "PS1" as the ID and one of its Constituent Volume is "T1CV1" and it is Tier "1" type that is placed within the primary storage device. Line 592 shows information for another Constituent Volume "T2CV5" of Pool "PS1" and that is Tier "2" type that is placed within the secondary storage device that is externally attached.

This table is referred by the Tiered Storage Management Module 200 to determine associated Constituent Volumes for specific Pool with Tier type.

FIG. 5 shows an exemplary data structure of Thin Provisioned Volume Table 600. Specifically, it shows the relationship between Pools and Thin Provisioned Volumes and the specific Chunk Table ID for the volume.

The TP-Vol ID column 610 provides identification information of a Thin Provisioned Volume.

Pool ID column 620 provides identification information of the Pool that the Volume was carved from.

Chunk Table ID column 630 provides an identification of a specific Chunk Table for the volume.

For instance, line 691 represents a record of a Thin Provisioned Volume, which has "TPVS1" as the ID and it was carved from Pool "PS1" and is related to the Chunk information that is stored in the Chunk Table "CTS1".

This table is referred by the Tiered Storage Management Module 200 to determine associated Pool and Chunk Table for the migration volume.

FIG. 6 shows an exemplary data structure of the Chunk Table. The contents of this table illustrates attributes of the Chunks.

Chunk ID column 710 provides identification information of a Chunk.

C-Vol ID column 720 provides an identification of Constituent Volume, which the Chunk was carved from.

Tier column 730 provides information on the tier of the Chunk or the Constituent Volume.

Start LBA column 740 provides an LBA on the Constituent Volume, which shows the start address of the Chunk.

Number of Blocks column 750 provides information on the number of valid blocks within the Chunk.

For instance, line 791 represents a record of a Chunk which has "CS1" as the ID, it is stored from LBA "0" on the Tier "1" Constituent Volume "T1CV1" with the valid "32" blocks from the beginning. During the allocation of Chunks to the specific size of data, it will be break down to Chunks with its maximum size of blocks (I assume 32 blocks for example). But end portion might not to fit this boundary thus it's often be less length than maximum blocks in a Chunk. For instance, Number of Blocks of line 793 shows it has only 25 blocks of valid data within the Chunk.

This table is referred by Tiered Storage Management Module 200 to obtain the Tier of respective Chunks and also to obtain its attributes during the migration operation.

FIGS. 7, 8 and 9 illustrate an exemplary process for Thin Provisioned Volume migration between the tiered storage systems executed by Tiered Storage Management Module 200. Through the steps from 1000 to 1020, the process creates a new Thin Provisioned Volume on the target Tier1 device side.

Step 1000: Create new Chunk Table on the target Tier1 device, which holds the Chunk information for the new Thin Provisioned Volume of the migration target.

Step 1010: The system will determine a proper Pool to carve a new Thin Provisioned Volume from the Pools, which exist on the migration target device. This could be determined using a variety of methods, such as choosing a Pool, which has the most free space.

Step 1020: Add new record to the Thin Provisioned Volume Table of target Tier1 device with new (the system generated) TP-Vol ID, ID for the Pool selected in step 1010 and Chunk Table ID of the created new Chunk Table in step 1000.

Through the steps from 1030 to 1070 the system mounts Tier2 Constituent Volumes of the Tier2 device to the migration target Tier1 device.

Step 1030: Select the record corresponding to the migration source volume from Thin Provisioned Volume Table of the source Tier1 device. In addition, a corresponding Pool ID is obtained.

Step 1040: Select a record from Pool Table of source Tier1 device where Pool ID is the value obtained in step 1030, which means the Pool related to the migration source volume, and also where the Constituent Volume is on the Tier2 device. If all records are processed then proceed to step 1100 otherwise proceed to step 1050.

Step 1050: Get ID of the corresponding Constituent Volume on the record selected in step 1040. If the Tier2 Constituent Volume has been mounted to the target Tier1 device then proceeds back to step 1040 or otherwise proceeds to step 1060. If any other Thin Provisioned Volume, which originally associated with the Pool, was migrated before to the target Tier1 device, related Tier2 Constituent Volumes might already be mounted to the target Tier1 device. In that case, it doesn't need to mount again.

Step 1060: Mount Tier2 Constituent Volume obtained in step 1050 to the target Tier1 device and associate it with the Pool determined in step 1010 (the Pool associated to the migration target Thin Provisioned Volume).

Step 1070: Add new record to Pool Table of target Tier1 device with Pool ID determined in step 1010, Tier type of 2 and Constituent Volume ID obtained in step 1050. And then proceed back to step 1040 for the next Tier2 Constituent Volume.

Through the steps from 1100 to 1150 it copies Tier1 Chunk data content.

Step 1100: Select the record for the migration source volume from Thin Provisioned Volume Table of source Tier1 device and get its Chunk Table ID.

Step 1110: Select a record from the selected Chunk Table in step 1100 where Tier is 1. If all records are processed then proceed to step 1200 otherwise proceed to step 1120.

Step 1120: Create a new Thin Provisioning Chunk at the target Tier1 device carving from Tier1 Constituent Volume.

Step 1130: Copy content data of the Chunk selected in step 1110 to the created Chunk in the target Tier1 device.

Step 1140: Add new record to Chunk Table created in step 1000 with new Chunk ID, Tier of 1, ID of the Constituent Volume that was used to create new Chunk in step 1120, Start LBA of the Chunk within the Constituent Volume and its Number of Blocks.

Step 1150: Release the Storage Extent of the Chunk on the source Tier1 device. And then proceed back to step 1110 for the next Tier1 Chunk copy.

Through the steps from 1200 to 1210 it copies just records of Tier2 data.

Step 1200: Select a record from the selected Chunk Table in step 1100 where Tier is 2. If all records are processed then proceed to step 1220 otherwise proceed to step 1210.

Step 1210: Add new record to the Chunk Table created in step 1000 with new Chunk ID, Tier of 2, and copy the rest of columns C-Vol ID/Start LBA/Number of Blocks as on the record selected in step 1200. And then proceed back to step 1200 for the next Tier2 Chunk entry.

Through the steps from 1220 to 1230 the process deletes Thin Provisioned Volume on the source Tier1 device.

Step 1220: Drop Chunk Table obtained in step 1100, which is the Chunk Table for the migration source Thin Provisioned Volume, from source Tier1 device.

Step 1230: Delete the record for migration source volume from the Thin Provisioned Volume Table of source Tier1 device.

A second embodiment of the inventive system will now be described. In the first embodiment described above only the contents of Tier1 Chunks were actually copied during the migration operation. Because the method of the first embodiment did not copy the entire content of Tier2 Chunks, it reduced the time of migration. In the second embodiment, to reduce the migration time as much as possible, the inventive system demotes every Tier1 Chunk to Tier2 Chunk prior to the migration process such that no actual data copy will be performed but only the remapping of the Tier2 Constituent Volume will be performed and hence the migration time will be extremely short. Because the chunk based tiered storage system has automatic/dynamic chunk migration mechanism between tiers within the system, the original Tier1 Chunks will be eventually promoted from Tier2 to Tier1, if the corresponding data has characteristics corresponding to Tier1. This occurs after the migration has been completed. Of course, in this case, the demotion and promotion process might be considered as an overhead from the perspective of overall migration operation. However, the priority of various operations depends on the usage characteristics of the system and, therefore, this method is described as another embodiment of this invention.

Most of the components and processes of the second embodiment are the same as the corresponding components and methods of the first embodiment. Thus, only the differences will be described below.

FIG. 10 illustrates an exemplary process for Chunk demotion (Tier1 to Tier2 Chunk) executed by the Tiered Storage Management Module 200. This process will be performed prior to the Volume Migration process shown in the first embodiment from step 1000 to 1230, when the migration operation has triggered.

Step 1300: Select the record for the migration source volume from Thin Provisioned Volume Table of source Tier1 device and get its Chunk Table ID.

Step 1310: Select a record from the selected Chunk Table in step 1300 where Tier is 1. If all records are processed, then proceed to step 1000 and start actual volume migration process. Otherwise proceed to step 1320.

Step 1320: Create a new Thin Provisioning Chunk at the source Tier1 device carving from Tier2 Constituent Volume.

Step 1330: Copy content data of the Chunk selected in step 1310 to the Chunk created in step 1320.

Step 1340: Update the record of the Chunk Table selected in step 1310, changing the Tier from "1" to "2" and C-Vol ID as the Constituent Volume ID that was used to create new Chunk in step 1320 and its Start LBA.

Step 1350: Release the Storage Extent of the Tier1 Chunk. After that, proceed back to step 1310 for the next Tier1 Chunk demotion.

After the completion of Tier1 Chunk demotion process above, the Volume Migration process, shown in the first embodiment starts from the step 1000. During the process, from step 1110 to step 1150, which copy Tier1 Chunk data between Tier1 devices will be skipped due to the fact that no Tier1 Chunks are left on the source Tier1 device after the demotion process. Therefore, the process of the Volume Migration is exactly the same as shown in the first embodiment and can be used in the second embodiment as well.

FIG. 11 is a block diagram that illustrates an embodiment of a computer/server system 1400 upon which an embodiment of the inventive methodology may be implemented. The system 1400 includes a computer/server platform 1401, peripheral devices 1402 and network resources 1403.

The computer platform 1401 may include a data bus 1404 or other communication mechanism for communicating information across and among various parts of the computer platform 1401, and a processor 1405 coupled with bus 1401 for processing information and performing other computational and control tasks. Computer platform 1401 also includes a volatile storage 1406, such as a random access memory (RAM) or other dynamic storage device, coupled to bus 1404 for storing various information as well as instructions to be executed by processor 1405. The volatile storage 1406 also may be used for storing temporary variables or other intermediate information during execution of instructions by processor 1405. Computer platform 1401 may further include a read only memory (ROM or EPROM) 1407 or other static storage device coupled to bus 1404 for storing static information and instructions for processor 1405, such as basic input-output system (BIOS), as well as various system configuration parameters. A persistent storage device 1408, such as a magnetic disk, optical disk, or solid-state flash memory device is provided and coupled to bus 1101 for storing information and instructions.

Computer platform 1401 may be coupled via bus 1404 to a display 1409, such as a cathode ray tube (CRT), plasma display, or a liquid crystal display (LCD), for displaying information to a system administrator or user of the computer platform 1401. An input device 1410, including alphanumeric and other keys, is coupled to bus 1401 for communicating information and command selections to processor 1405. Another type of user input device is cursor control device 1411, such as a mouse, a trackball, or cursor direction keys for communicating direction information and command selections to processor 1404 and for controlling cursor movement on display 1409. This input device typically has two degrees of freedom in two axes, a first axis (e.g., x) and a second axis (e.g., y), that allows the device to specify positions in a plane.

An external storage device 1412 may be coupled to the computer platform 1401 via bus 1404 to provide an extra or removable storage capacity for the computer platform 1401. In an embodiment of the computer system 1400, the external removable storage device 1412 may be used to facilitate exchange of data with other computer systems.

The invention is related to the use of computer system 1400 for implementing the techniques described herein. In an embodiment, the inventive system may reside on a machine such as computer platform 1401. According to one embodiment of the invention, the techniques described herein are performed by computer system 1400 in response to processor 1405 executing one or more sequences of one or more instructions contained in the volatile memory 1406. Such instructions may be read into volatile memory 1406 from another computer-readable medium, such as persistent storage device 1408. Execution of the sequences of instructions contained in the volatile memory 1406 causes processor 1405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1405 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 1408. Volatile media includes dynamic memory, such as volatile storage 1406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1405 for execution. For example, the instructions may initially be carried on a magnetic disk from a remote computer. Alternatively, a remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on the data bus 1404. The bus 1404 carries the data to the volatile storage 1406, from which processor 1405 retrieves and executes the instructions. The instructions received by the volatile memory 1406 may optionally be stored on persistent storage device 1408 either before or after execution by processor 1405. The instructions may also be downloaded into the computer platform 1401 via Internet using a variety of network data communication protocols well known in the art.

The computer platform 1401 also includes a communication interface, such as network interface card 1413 coupled to the data bus 1404. Communication interface 1413 provides a two-way data communication coupling to a network link 1414 that is coupled to a local network 1415. For example, communication interface 1413 may be an integrated services digital network (ISDN) card or a modem to provide a data communication connection to a corresponding type of telephone line. As another example, communication interface 1413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1413 sends and receives electrical, electromagnetic or optical signals that carry digital data streams representing various types of information.

Network link 1413 typically provides data communication through one or more networks to other network resources. For example, network link 1414 may provide a connection through local network 1415 to a host computer 1416, or a network storage/server 1417. Additionally or alternatively, the network link 1413 may connect through gateway/firewall 1417 to the wide-area or global network 1418, such as an Internet. Thus, the computer platform 1401 can access network resources located anywhere on the Internet 1418, such as a remote network storage/server 1419. On the other hand, the computer platform 1401 may also be accessed by clients located anywhere on the local area network 1415 and/or the Internet 1418. The network clients 1420 and 1421 may themselves be implemented based on the computer platform similar to the platform 1401.

Local network 1415 and the Internet 1418 both use electrical, electromagnetic or optical signals that carry digital data streams. The signals through the various networks and the signals on network link 1414 and through communication interface 1413, which carry the digital data to and from computer platform 1401, are exemplary forms of carrier waves transporting the information.

Computer platform 1401 can send messages and receive data, including program code, through the variety of network(s) including Internet 1418 and LAN 1415, network link 1414 and communication interface 1413. In the Internet example, when the system 1401 acts as a network server, it might transmit a requested code or data for an application program running on client(s) 1420 and/or 1421 through Internet 1418, gateway/firewall 1417, local area network 1415 and communication interface 1413. Similarly, it may receive code from other network resources.

The received code may be executed by processor 1405 as it is received, and/or stored in persistent or volatile storage devices 1408 and 1406, respectively, or other non-volatile storage for later execution. In this manner, computer system 1401 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized tiered storage systems with data migration functionality. It is intended that the specification and examples be considered as exemplary only, with a true scope and spirit of the invention being indicated by the following claims.

What is claimed is:

1. A computerized storage system comprising:
   a. a client host computer;
   b. a source first tier storage system operatively coupled to the client host computer, the source first tier storage system having at least one source first tier storage device having a plurality of source first tier chunks arranged into a source chunk pool and a source storage controller;
   c. a second tier storage system operatively coupled to the source first tier storage system, the second tier storage system having at least one second tier storage device having a plurality of second tier chunks arranged into the chunk pool of the source first tier storage system, wherein the source storage controller is operable to allocate source first tier chunks or second tier chunks from the source chunk pool to a source thin provisioned volume accessible by the host computer upon a receipt of a write command directed to the source thin provisioned volume from the host computer; and
   d. a target first tier storage system operatively coupled to the client host computer and to the second tier storage system, the target first tier storage system having at least one target first tier storage device having a plurality of target first tier chunks arranged into a target chunk pool and a target storage controller operable to establish a target thin provisioning volume,
   wherein upon migration of data from the source thin provisioning volume to the target thin provisioning volume the source first tier chunks of the source thin provisioning volume are copied to the target first tier chunks of the target thin provisioning volume and the second tier chunks are re-mapped from source second tier chunks of the source thin provisioning volume to target second tier chunks of the target thin provisioning volume without copying data in the second tier chunks.

2. The computerized storage system of claim 1, wherein after the migration, the target thin provisioning volume is accessed by the host computer and the second tier chunks is accessed by the target storage controller instead of the source storage controller;
   wherein when the second tier chunks are re-mapped, changing an access path from the host without changing data location within the second tier storage device.

3. The computerized storage system of claim 1, wherein after the migration, the target first tier chunks and second tier chunks are arranged into the target chunk pool;
   wherein after said migration, said plurality of second tier chunks are arranged into the chunk pool of the target first tier storage system, wherein the second storage controller is operable to allocate target first tier chunks or second tier chunks from the source chunk pool to a target thin provisioned volume accessible by the host computer upon a receipt of a write command directed to the target thin provisioned volume from the host computer.

4. The computerized storage system of claim 1, wherein the second tier storage device is arranged into a second tier constituent volume comprising storage extents corresponding to second tier chunks and wherein upon the migration, the second tier chunks of the source thin provisioned volume are located on the second tier constituent volume.

5. The computerized storage system of claim 4, wherein during the migration, the second tier constituent volume is unmounted from the source first tier storage system and mounted on the target first tier storage system.

6. The computerized storage system of claim 1, wherein the target thin provisioning volume is established at the beginning of the migration.

7. The computerized storage system of claim 1, wherein after the migration, the source thin provisioning volume is deleted.

8. A computerized storage system comprising:
   a. a client host computer;
   b. a source first tier storage system operatively coupled to the client host computer, the source first tier storage system having at least one source first tier storage device having a plurality of source first tier chunks arranged into a source chunk pool and a source storage controller; and
   c. a second tier storage system operatively coupled to the source first tier storage system, the second tier storage system having at least one second tier storage device having a plurality of second tier chunks arranged into the chunk pool of the source first tier storage system, wherein the source storage controller is operable to allocate source first tier chunks or second tier chunks from the source chunk pool to a source thin provisioned volume accessible by the host computer upon a receipt of a write command directed to the source thin provisioned volume from the host computer; and d. a target first tier storage system operatively coupled to the client host computer and the second tier storage system, the target first tier storage system having at least one target first tier storage device having a plurality of target first tier chunks arranged into a target chunk pool and a target storage controller operable to establish a target thin provisioning volume, wherein upon migration of data from the source thin provisioning volume to the target thin provisioning volume the source first tier chunks of the source thin provisioning volume are demoted to new second tier chunks of the source thin provisioning volume and the second tier chunks are re-mapped from second tier chunks of the source thin provisioning volume to second tier chunks of the target thin provisioning volume without copying data in the second tier chunks.

9. The computerized storage system of claim 8, wherein when the source first tier chunks of the source thin provisioning volume are demoted, the new second tier chunks are allocated to the source thin provisioning volume, the source first tier chunks of the source thin provisioning volume are copied to the new second tier chunks allocated to the source thin provisioning volume, and the source first tier chunks of the source thin provisioning volume are released to the source chunk pool.

10. The computerized storage system of claim 8, wherein after the migration, at least a portion of second tier chunks is promoted to the target first tier chunks.

11. A method performed in a computerized storage system comprising a client host computer; a source first tier storage system operatively coupled to the client host computer, the source first tier storage system having at least one source first tier storage device having a plurality of source first tier chunks arranged into a source chunk pool and a source storage controller; and a second tier storage system operatively coupled to the source first tier storage system, the second tier storage system having at least one second tier storage device having a plurality of second tier chunks arranged into the chunk pool of the source first tier storage system, and a target first tier storage system operatively coupled to the client host computer and to the second tier storage system, the target first tier storage system having at least one target first tier storage device having a plurality of target first tier chunks arranged into a target chunk pool the method comprising:

a. upon migration of the data from the source thin provisioning volume to the target thin provisioning volume, copying the source first tier chunks of the source thin provisioning volume to the target first tier chunks of the target thin provisioning volume without copying data in the second tier chunks; and b. re-mapping the second tier chunks from second tier chunks of the source thin provisioning volume to second tier chunks of the target thin provisioning volume;

wherein the source storage controller allocates source first tier chunks or second tier chunks from the source chunk pool to a source thin provisioned volume accessible by the host computer upon a receipt of a write command directed to the source thin provisioned volume from the host computer;

wherein a target storage controller establishes a target thin provisioning volume.

12. The method of claim 11, further comprising, after the migration, making the target thin provisioning volume accessed by the host computer and the second tier chunks is accessed by the target storage controller instead of the source storage controller;

wherein when the second tier chunks are re-mapped, changing an access path from the host without changing data location within the second tier storage device.

13. The method of claim 11, further comprising arranging, after the migration, the target first tier chunks and second tier chunks into the target chunk pool.

14. The method of claim 11, wherein the second tier storage device is arranged into a second tier constituent volume comprising storage extents corresponding to second tier chunks.

15. The method of claim 14, wherein during the migration, the second tier constituent volume is unmounted from the source first tier storage system and mounted on the target first tier storage system.

16. The method of claim 11, wherein the target thin provisioning volume is established at the beginning of the migration.

17. The method of claim 11, wherein after the migration, the source thin provisioning volume is deleted.

18. A method performed in a computerized storage system comprising a client host computer; a source first tier storage system operatively coupled to the client host computer, the source first tier storage system having at least one source first tier storage device having a plurality of source first tier chunks arranged into a source chunk pool and a source storage controller; and a second tier storage system operatively coupled to the source first tier storage system, the second tier storage system having at least one second tier storage device having a plurality of second tier chunks arranged into the chunk pool of the source first tier storage system, and a target first tier storage system operatively coupled to the client host computer and to the second tier storage system, the target first tier storage system having at least one target first tier storage device having a plurality of target first tier chunks arranged into a target chunk pool the method comprising:

a. upon migration of data from the source thin provisioning volume to the target thin provisioning volume, demoting the source first tier chunks of the source thin provisioning volume to second tier chunks of the source thin provisioning volume without copying data in the second tier chunks; and b. re-mapping the second tier chunks from second tier chunks of the source thin provisioning volume to the second tier chunks of the target thin provisioning volume;

wherein the source storage controller allocates source first tier chunks or second tier chunks from the source chunk pool to a source thin provisioned volume accessible by the host computer upon a receipt of a write command directed to the source thin provisioned volume from the host computer;

wherein a target storage controller establishes a target thin provisioning volume.

19. The method of claim 18, wherein during the demoting, the new second tier chunks are allocated to the source thin provisioning volume, the source first tier chunks of the source thin provisioning volume are copied to the new second tier chunks allocated to the source thin provisioning volume, and the source first tier chunks of the source thin provisioning volume are released to the source chunk pool.

20. The method of claim 18, further comprising, after the migration, promoting at least a portion of second tier chunks to the target first tier chunks.

* * * * *